US012313238B2

(12) United States Patent
Kim

(10) Patent No.: US 12,313,238 B2
(45) Date of Patent: May 27, 2025

(54) LAMP

(71) Applicant: HYUNDAI MOBIS CO., LTD., Seoul (KR)

(72) Inventor: Chul Hyun Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/345,443

(22) Filed: Jun. 30, 2023

(65) Prior Publication Data

US 2024/0210007 A1 Jun. 27, 2024

(51) Int. Cl.
*F21S 43/20* (2018.01)
*F21S 43/31* (2018.01)
*F21S 43/33* (2018.01)

(52) U.S. Cl.
CPC ............... *F21S 43/26* (2018.01); *F21S 43/31* (2018.01); *F21S 43/33* (2018.01)

(58) Field of Classification Search
CPC .. F21S 43/26; F21S 43/33; F21S 43/31; F21S 43/245; F21S 41/145
See application file for complete search history.

(56) References Cited

U.S. PATENT DOCUMENTS 6,951,415 B2 * 10/2005 Amano ................. F21S 43/241 362/520
7,946,743 B2 * 5/2011 Natsume ................. F21S 43/14 362/509
9,267,667 B2 * 2/2016 Jiang ..................... F21V 13/045
12,044,376 B2 * 7/2024 Wu ......................... F21S 41/33
2014/0185310 A1 7/2014 Lisowski et al.
2023/0003355 A1 * 1/2023 Kanezuka ............... F21S 41/33

FOREIGN PATENT DOCUMENTS

| | | | | |
|---|---|---|---|---|
| CN | 113531478 A | | 10/2021 | |
| DE | 10133869 A1 | | 2/2002 | |
| DE | 102007019688 A1 | | 10/2008 | |
| DE | 102011119859 A1 | | 6/2012 | |
| DE | 202022104061 U1 | | 7/2022 | |
| EP | 1387122 A1 | | 2/2004 | |
| FR | 3013102 A1 | * | 5/2015 | B60Q 1/0058 |
| JP | H06-176608 A | | 6/1994 | |
| JP | 2010015744 A | * | 1/2010 | |

OTHER PUBLICATIONS

Extended European search report issued May 23, 2024 in corresponding European Patent Application No. 23183537.2.
Office Action dated Feb. 5, 2025 issued in the corresponding European patent application No. 23183537.2.

* cited by examiner

*Primary Examiner* — Matthew J. Peerce
(74) *Attorney, Agent, or Firm* — NovoTechIP International PLLC

(57) ABSTRACT

Disclosed is a lamp that outputs a light beam to an outside in a first direction, the lamp including a light source part that outputs the light beam, and an inner lens including a reflective area that reflects the light beam output from the light source part and an output area that outputs the light beam reflected by the reflective area in the first direction and is disposed closer to the first direction than the reflective area.

15 Claims, 10 Drawing Sheets

LAMP

CROSS-REFERENCE TO RELATED APPLICATIONS

This application claims the benefit of priority to Korean Patent Application No. 10-2022-0184910, filed in the Korean Intellectual Property Office on Dec. 26, 2022, the entire contents of which are incorporated herein by reference.

TECHNICAL FIELD

The present disclosure relates to a lamp.

BACKGROUND

In general, a rear lamp provided on a rear side of a vehicle serves to provide information to an outside person. Such a lamp is provided with a light source that outputs a light beam and a lens that outputs the light beam output from the light source. The light beam output from the light source is diffused until the light beam reaches the lens, and the diffused light beam passes through the lens and is then output to the outside. In such a lens, a traveling direction of the light beam is changed so that the light beam passing through the lens is directed toward a target direction (for example, a rearward direction). In this case, the light beam output from the light source needs to be sufficiently spread so that the light beam may be uniformly output from upper and lower areas of an output surface of the lens.

A lamp according to the related art is manufactured such that an air gap is formed between the lens and the light source so that the light beam output from the light source may be sufficiently spread until the light beam reaches the lens. Meanwhile, to form such an air gap, the lens and the light source should be arranged to be spaced a predetermined distance from each other. Such a lamp should be manufactured to have a large volume to have the air gap, and in a vehicle provided with the lamp having a large volume, space efficiency is degraded.

Thus, in recent years, the light beam may be uniformly output toward the target direction from the output surface of the lens even without such an air gap, and thus the needs for lamps having minimized volumes are increasing.

SUMMARY

The present disclosure has been made to solve the above-mentioned problems occurring in the prior art while advantages achieved by the prior art are maintained intact.

An aspect of the present disclosure provides a lamp which may output a light beam in a targeted direction without an air gap, and thus has a minimized volume.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a lamp that outputs a light beam to an outside in a first direction, the lamp including a light source part that outputs the light beam, and an inner lens including a reflective area that reflects the light beam output from the light source part and an output area that outputs the light beam reflected by the reflective area in the first direction and is disposed closer to the first direction than the reflective area.

Further, a lamp may be provided in which the output area may be disposed at an end of the light source part in the first direction.

Further, a lamp may be provided in which a side of the reflective area in the first direction and a side of the output area in a second direction opposite to the first direction may face each other.

Further, a lamp may be provided in which a plurality of output optic grooves retracted in a second direction and arranged to be spaced apart from each other may be formed in the output area.

Further, a lamp may be provided in which, when the plurality of output optic grooves are viewed in the first direction, the plurality of output optic grooves may have one or more shapes among a circular shape and polygonal shapes.

Further, a lamp may be provided in which the inner lens may further include an optic area through which the light beam output from the light source part is input, passes, and is then output to the reflective area, and the optic area may have a concave shape in a second direction.

Further, a lamp may be provided in which the optic area, the reflective area, and the output area may be integrally formed.

Further, a lamp may be provided in which the light source part may include a printed circuit board extending along the inner lens, and a plurality of light sources arranged on a side of the printed circuit board in the second direction to be spaced apart from each other in a direction in which the printed circuit board extends, and the optic area may be provided as a plurality of optic areas to surround the plurality of light sources, respectively.

Further, a lamp may be provided in which an end of the optic area in the second direction may extend in a vertical direction.

Further, a lamp may be provided in which an upper portion of the optic area may extend from an upper end of an end in the second direction toward the output area in the first direction by a first length, a lower portion of the optic area may extend from a lower end of the end of the optic area in the second direction toward the output area in the first direction by a second length, and the first length may be smaller than the second length.

Further, a lamp may be provided in which the lamp may further include a back cover that surrounds a side of the inner lens in a second direction, wherein the back cover includes a cover body of which a side in the first direction faces a side of the reflective area in the second direction, and a back cover optic protruding in the first direction from a side of the cover body in the first direction.

Further, a lamp may be provided in which the cover body may obliquely extend such that an upper side thereof is inclined toward the second direction with respect to a vertical direction, the back cover optic may be provided as a plurality of back cover optics, and the plurality of back cover optics may be arranged to be spaced apart from each other.

Further, a lamp may be provided in which lengths, by which the cover bodies of the plurality of back cover optics protrude in the first direction from sides thereof in the first direction, are the same.

Further, a lamp may be provided in which a length by which first cover bodies of some of the plurality of back cover optics protrude in the first direction from sides thereof in the first direction may be different from a length by which first cover bodies of the others of the plurality of back cover optics protrude in the first direction from sides thereof in the first direction.

Further, a lamp may be provided in which a gap having a width in the first direction that is smaller than a length by which the back cover optic protrudes from a side thereof in the first direction toward the reflective area may be formed between the side of the cover body in the first direction and the reflective area.

Further, a lamp may be provided in which a portion of the light beam that is output from the light source part and reaches the reflective area may be reflected in the first direction and the other thereof may pass through the reflective area, and the light beam passing through the reflective area may pass through the gap and may be then diffused from the first direction on a surface of the cover body.

Further, a lamp may be provided in which a reflective material may be deposited on a surface of the back cover optic in the first direction.

Further, a lamp may be provided in which the reflective material may include an aluminum material.

Further, a lamp may be provided in which, when the lamp is viewed in a direction perpendicular to the first direction and a vertical direction, at least a portion of the back cover optic and at least a portion of the reflective area may overlap each other.

Further, a lamp may be provided in which, when the back cover optic is viewed in the second direction, the back cover optic has one or more among a circular shape and polygonal shapes.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
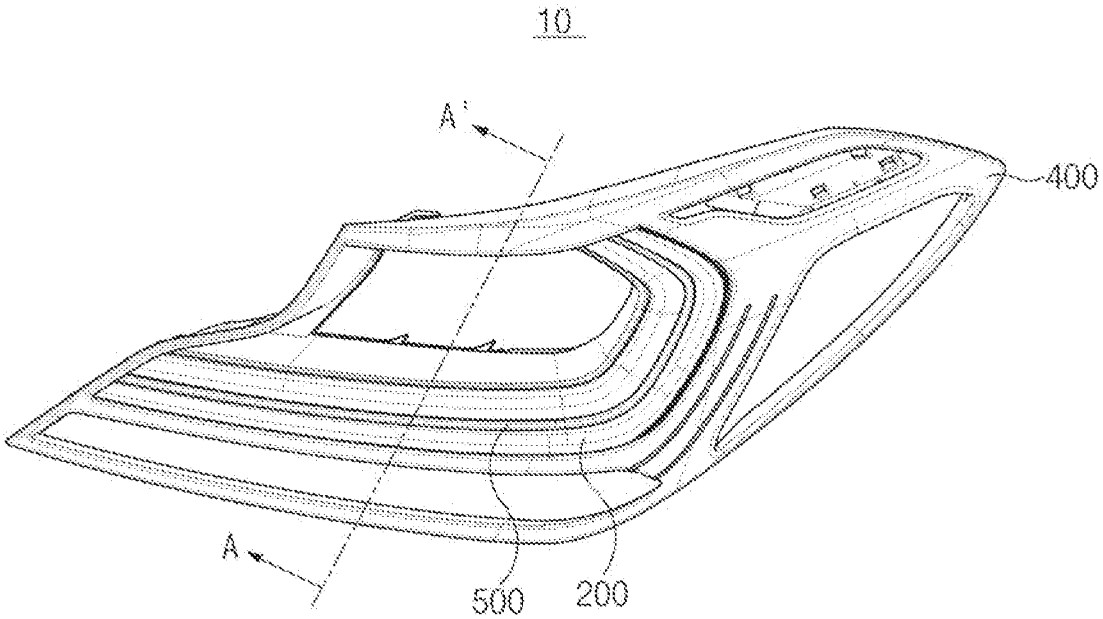
FIG. 1 is a perspective view of a lamp according to a first embodiment of the present disclosure.

Hereinafter, some embodiments of the present disclosure will be described in detail with reference to the exemplary drawings. In adding reference numerals to components of each drawing, it should be noted that identical or equivalent components are designated by an identical numeral even when they are displayed on other drawings. Further, in describing the embodiment of the present disclosure, a detailed description of the related known configuration or function will be omitted when it is determined that it interferes with the understanding of the embodiment of the present disclosure.

Further, in the description of components of the embodiments of the present disclosure, the terms such as first, second, A, B, (a) and (b) may be used. These terms are merely intended to distinguish one component from other components, and the terms do not limit the nature, order, or sequence of the components. When it is described that one component "is input into", "is reflected by", "is output from", or "passes through" another component, the component may be directly input into, be directly reflected by, be directly output from, or directly pass through the other component, but a third component may "be input", "be reflected", "be output", or "pass" between the components.

Hereinafter, a lamp 10 according to a first embodiment will be described with reference to the accompanying drawings.

Figure 2:
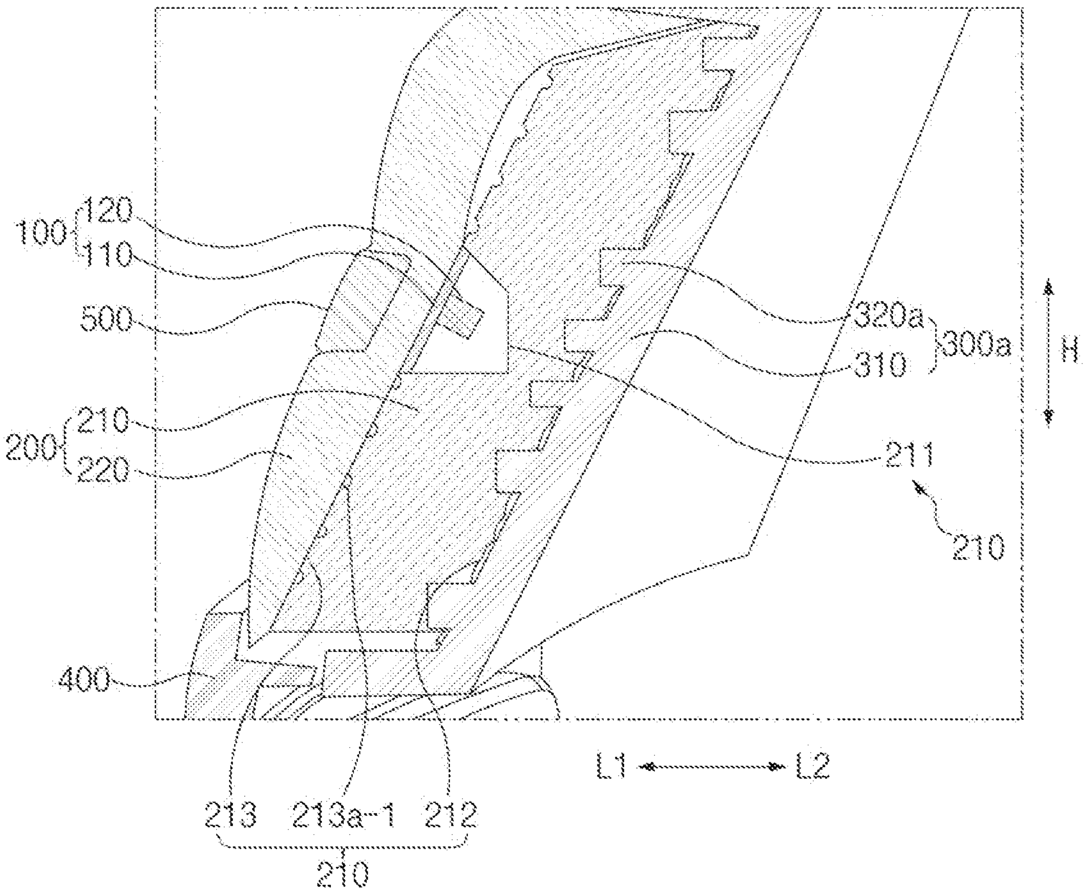
FIG. 2 is a longitudinal cross-sectional view along line A-A' of FIG. 1.
Figure 3:
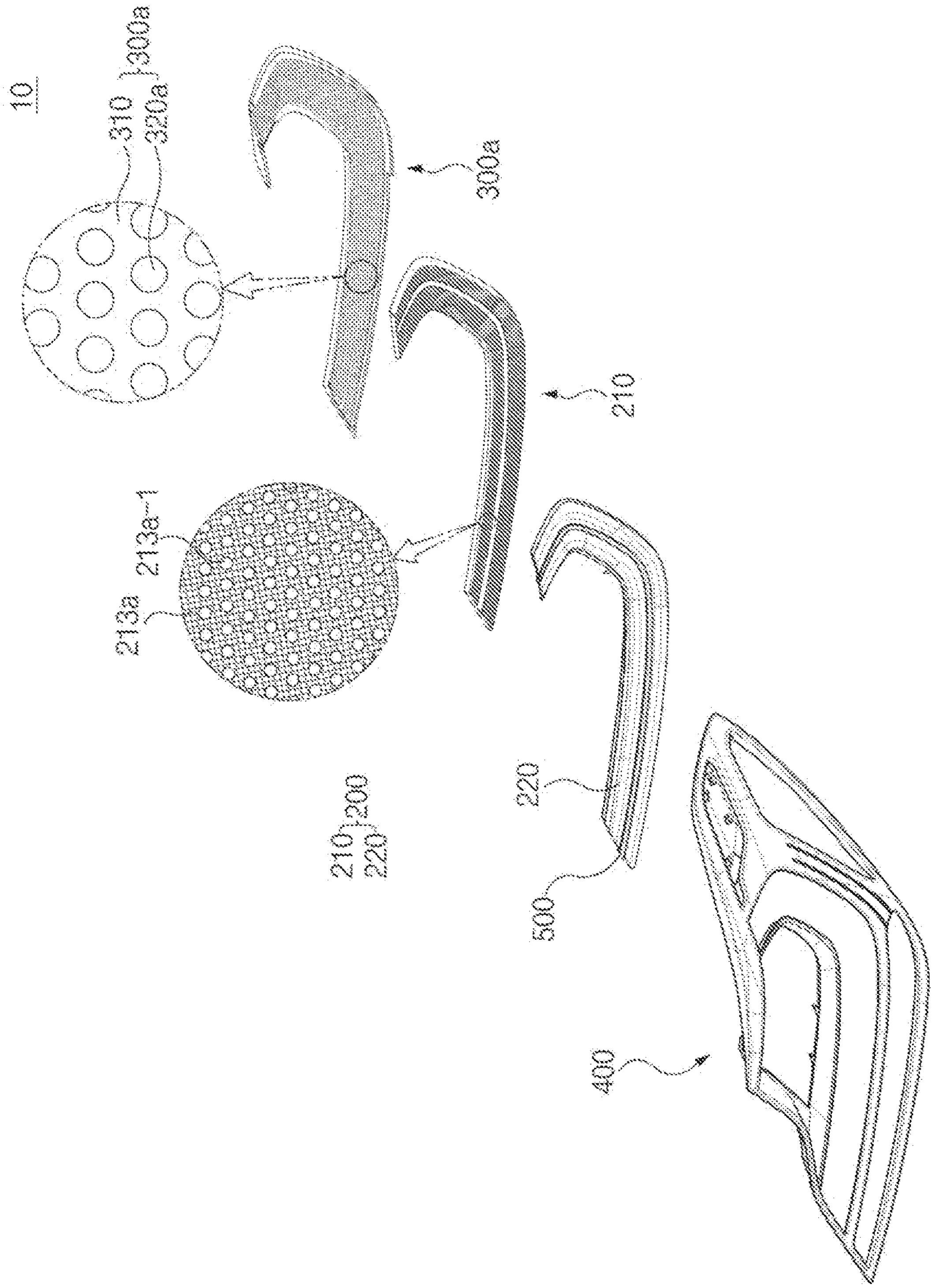
FIG. 3 is an exploded perspective view of the lamp according to the first embodiment of the present disclosure.

The lamp 10 may provide information to an outside person. As an example, the lamp 10 may be a rear lamp provided on a rear side of a vehicle. Referring to FIGS. 1 to 3, the lamp 10 may include a light source part 100, a lens part 200, a back cover 300*a*, a frame 400, and a bezel 500.

The light source part 100 may include a printed circuit board 110 and a light source 120. Referring back to FIG. 2, the printed circuit board 110 may be electrically connected to the light source 120. The printed circuit board 110 may be a printed circuit board (PCB). The printed circuit board 110 may have a band shape extending along the lens part 200. Further, the printed circuit board 110 may be disposed to face the back cover 300*a* and the bezel 500. For example, a side surface of the printed circuit board 110 in a first direction L1 may be disposed to face the bezel 500, and a side surface of the printed circuit board 110 in a second direction L2 may be disposed to face the back cover 300*a*. The first direction L1 may be defined as a traveling direction of a light beam output from the lamp 10. The first direction L1 may be, for example, a rearward direction. The second direction L2 may be defined as a direction opposite to the first direction L1. A width of the printed circuit board 110 may be, for example, 0.45 mm to 0.55 mm. The width of the printed circuit board 110 may be a width in a direction perpendicular to an inclination direction and a left-right direction, which will be described below. However, the present disclosure is not limited to these examples.

The light source 120 may output a light beam. The light source 120 may be provided with a first surface disposed on the side surface of the printed circuit board 110 in the second direction L2. Further, the light source 120 may be provided with a second surface disposed to face the back cover 300*a*. For example, the first surface of the light source 120 may be in close contact with the printed circuit board 110, and the second surface of the light source 120 may be disposed to face the back cover 300*a*.

As an example, the light source 120 may be a light emitting diode (LED). In more detail, the light source 120 may be a 4FLED that outputs light beams from four portions thereof. Further, when the light source 120 is the 4FLED, the light beams may be output from side surfaces of the light source 120, which is a surface perpendicular to the first surface and the second surface of the light source 120. As an example, the side surfaces of the light source 120 may include four or more surfaces. However, the spirit of the present disclosure is not limited thereto, and the light beam may be output from the second surface of the light source 120. The light source 120 may be provided as a plurality of light sources 120. The plurality of light sources 120 may be arranged to be spaced apart from each other along the printed circuit board 110.

The lens part 200 may output the light beam output from the light source 120 to the outside of the lamp 10. For example, the light beam output from the light source 120 is input into, passes through, and is then output from the lens part 200 to the outside. The lens part 200 may include an inner lens 210 and an outer lens 220.

Referring back to FIG. 2, the inner lens 210 may output the light beam output from the light source 120 to the outer lens 220. The inner lens 210 may be disposed between the outer lens 220 and the back cover 300*a*. For example, the inner lens 210 may be disposed closer to the second direction L2 than the outer lens 220 and disposed closer to the first direction L1 than the back cover 300*a*. The inner lens 210 may be fastened to the back cover 300*a*. Further, the inner lens 210 may obliquely extend such that an upper side of the inner lens 210 is inclined toward the second direction L2 with respect to a vertical direction "H." For example, an end of an upper end of the inner lens 210 in the second direction L2 may be disposed closer to the second direction L2 than an end of a lower end of the inner lens 210 in the second direction L2. In more detail, when the inner lens 210 is viewed in a direction perpendicular to the first direction L1 and the vertical direction "H," the inner lens 210 may extend in an oblique direction that is a direction of a vector defined by a sum of an upward vector and a vector in the second direction L2. A width of the inner lens 210 may be, for example, 0.65 mm to 0.75 mm. However, the present disclosure is not limited to these examples. The width of the inner lens 210 may be a width in a direction perpendicular to the inclination direction and the left-right direction. The inner lens 210 may include an optic area 211, a reflective area 212, and an output area 213*a*.

The light beam output from the light source 120 may be input into the optic area 211. The light beam input into the optic area 211 may be output to the reflective area 212. The optic area 211 may have a shape surrounding the light source 120. For example, the optic area 211 may have a concave shape in the second direction L2. In more detail, the optic area 211 may form a space in which the light source 120 may be accommodated. When the optic area 211 is viewed in the first direction L1, the optic area 211 may have a circular or and polygonal shape. Further, the optic area 211 may be disposed in a central portion of the output area 213*a*.

An end of the optic area 211 in the second direction L2 may extend vertically. Further, an upper portion of the optic area 211 may extend from an upper end of an end of the optic area 211 in the second direction L2 toward the output area 213*a* in the first direction L1 by a first length. Further, a lower portion of the optic area 211 may extend from a lower end of the end of the optic area 211 in the second direction L2 toward the output area 213*a* in the first direction L1 by a second length. Further, the first length and the second length may be different from each other. For example, the first length may be smaller than the second length. In other words, an extension length of the lower portion of the optic area 211 may be greater than an extension length of the upper portion of the optic area 211.

The optic area 211 may be provided as a plurality of optic areas 211. The plurality of optic areas 211 may be arranged to correspond to the plurality of light sources 120. For example, the plurality of optic areas 211 may be arranged to surround the plurality of light sources 120, respectively.

The reflective area 212 may reflect the light beam output from the optic area 211. For example, a portion of the light beam reflected by the reflective area 212 may be reflected in the first direction L1, and the other portion thereof may pass through the reflective area 212. The light beam passing through the reflective area 212 may reach the back cover 300*a*. The reflective area 212 may form a side of the inner lens 210 in the second direction L2. A groove retracted in the first direction L1 and having a concave-convex shape may be formed in the reflective area 212. The reflective area 212 may be disposed closer to the second direction L2 than the light source part 100. For example, the reflective area 212 may be spaced apart from the light source part 100 in the first direction L1 and the second direction L2. In more detail, the reflective area 212 may be spaced apart from the optic area 211 in the first direction L1 and the second direction L2.

The light beam reflected by the reflective area 212 may be output from the output area 213*a*. The output area 213*a* may form a side of the inner lens 210 in the first direction L1. An upper portion of the output area 213*a* may extend upward in an oblique direction from an end of the upper portion of the optic area 211 in the first direction L1. Further, a lower portion of the output area 213*a* may extend downward in the oblique direction from an end of the lower portion of the optic area 211 in the first direction L1. The output area 213*a* may be spaced apart from the reflective area 212 in the first direction L1 and the second direction L2. The output area 213*a* may be integrally formed with the optic area 211. In more detail, the optic area 211, the reflective area 212, and the output area 213*a* may be integrally formed. Further, an output optic groove 213*a*-1 may be formed in the output area 213*a*.

The output optic groove 213*a*-1 may be a groove recessed in the second direction L2 from an end of the output area 213*a* in the first direction L1. Further, when the output area 213*a* is viewed in the first direction L1, the output optic groove 213*a*-1 may have a circular shape. The output optic groove 213*a*-1 may be provided as a plurality of output optic grooves 213*a*-1. The plurality of output optic grooves 213*a*-1 may be arranged to be spaced apart from each other. The light beam output from the inner lens 210 is input into, passes through, and is then output from the outer lens 220. A side of the outer lens 220 in the first direction L1 may form an exterior of the lamp 10 in the first direction L1. Further, an empty space may be formed between an upper portion of the outer lens 220 and the upper portion of the output area 213*a*. The upper portion of the outer lens 220 may have a convex shape in the first direction L1.

The light beam passing through the reflective area 212 may reach the back cover 300*a*. The back cover 300*a* may form an exterior of the lamp 10 in the second direction L2. The back cover 300*a* may be supported by the frame 400. Further, the back cover 300*a* may support the inner lens 210. The back cover 300*a* may include the cover body 310 and the back cover optic 320*a*.

A surface of the cover body 310 in the first direction L1 may face the reflective area 212. The cover body 310 may extend in the oblique direction. Further, a gap may be formed between the cover body 310 and the groove of the reflective area 212. For example, the light beam passing through the reflective area 212 may pass through the gap and then reach a surface of the cover body 310. Widths of the gap in the first direction L1 and the second direction L2 may be smaller than a protrusion length "d," which will be described below. The light beam that reaches the surface of the cover body 310 in the first direction L1 may be diffused in the first direction L1. A state in which the light beam is diffused in the first direction L1 may be understood as a state in which the light beam travels in the first direction L1 but is diffused in a direction skewed from the first direction L1. Further, the light beam may be scattered on the surface of the cover body 310 in the first direction L1. The surface of the cover body 310 in the first direction L1 may be made of, for example, a white material. A width of the cover body 310 may be, for example, 2 mm. However, the present disclosure is not limited to these examples. Further, the width of the cover body 310 may be a width in a direction perpendicular to the inclination direction and the left-right direction.

Figure 4:
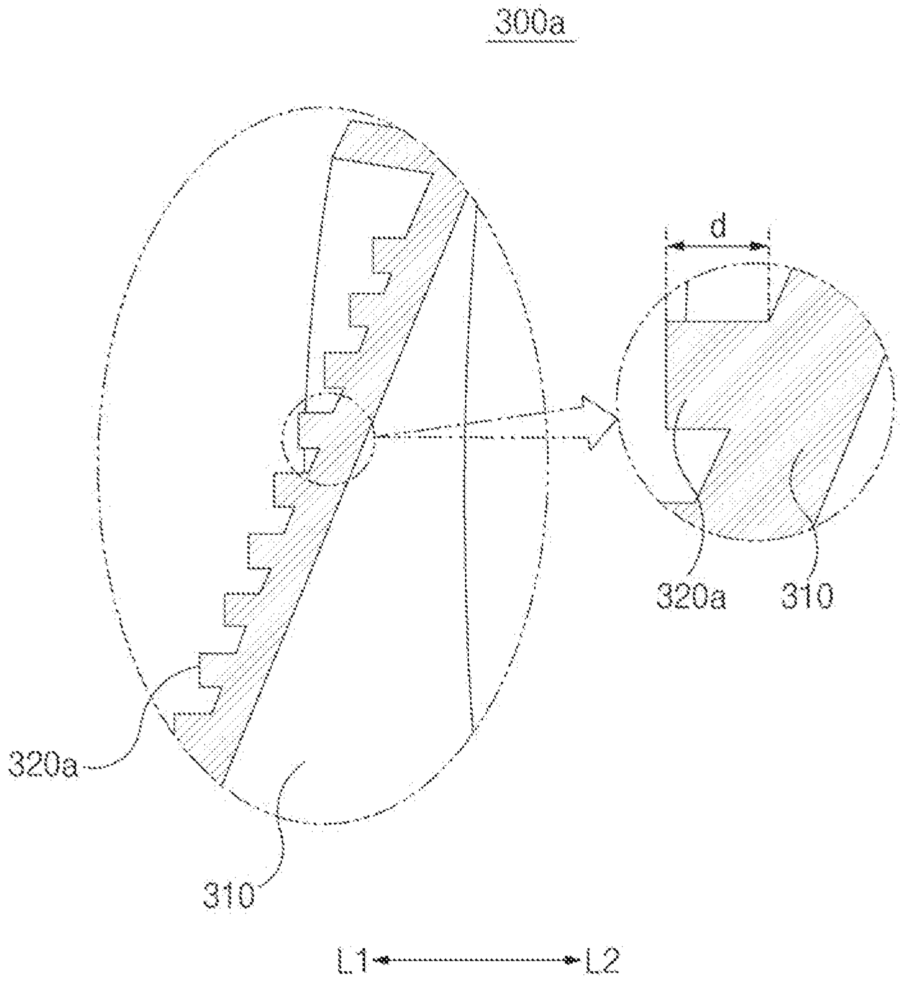
FIG. 4 is a cross-sectional perspective view of a back cover according to the first embodiment of the present disclosure.

Referring to FIG. 4, the back cover optic 320*a* may reflect the light beam passing through the reflective area 212 in the first direction L1. A reflective material may be deposited on a surface of the back cover optic 320*a* in the first direction L1. Examples of the reflective material may include aluminum (Al). A reflectance of the light beam that reaches the back cover optic 320*a* may increase through the reflective material. Further, a luminous intensity of the light beam diffused from the surface of the cover body 310 in the first direction L1 may be smaller than a luminous intensity of the light beam reflected by the back cover optic 320*a*. In other words, among the light beam output from the lamp 10, a brightness of the light beam reflected by the back cover optic 320*a* may be greater than a brightness of the light beam diffused from the surface of the cover body 310 in the first direction L1.

Further, the light beam output from the lamp 10 may form a light pattern corresponding to a shape of the back cover optic 320*a*. When the back cover optic 320*a* is viewed in the second direction L2, the back cover optic 320*a* may have a circular shape. Further, a size of the back cover optic 320*a* may be greater than a size of the output optic groove 213*a*-1. For example, a diameter of the circular shape of the back cover optic 320*a* may be greater than a diameter of the circular shape of the output optic groove 213*a*-1.

The back cover optic 320*a* may be provided on the surface of the cover body 310 in the first direction L1. The back cover optic 320*a* may have a shape protruding in the first direction L1 from the surface of the cover body 310 in the first direction L1. A length by which the back cover optic 320*a* protrudes in the first direction L1 from the surface of the cover body 310 in the first direction L1 may be named the protrusion length "d." A separation distance between the back cover optic 320*a* and the optic area 211 in the first direction L1 may be smaller than the width of the inner lens 210. The width of the back cover optic 320*a* may be a width in a direction perpendicular to the inclination direction and the left-right direction. Further, the separation distance between the back cover optic 320*a* and the optic area 211 in the first direction L1 may be smaller than the width of the cover body 310. Further, the separation distance between the back cover optic 320*a* and the optic area 211 in the first direction L1 may be greater than the protrusion length "d."

The back cover optic 320*a* may be surrounded by the reflective area 212. Further, when the lamp 10 is viewed in the direction perpendicular to the first direction L1 and the vertical direction "H," at least a portion of the back cover optic 320*a* and at least a portion of the reflective area 212 may overlap each other. The direction perpendicular to the first direction L1 and the vertical direction "H" may be, for example, the left-right direction. For example, when the back cover optic 320*a* and the reflective area 212 are projected on each other in the left-right direction, an area in which the back cover optic 320*a* and the reflective area 212 overlap each other may be formed.

The back cover optic 320*a* may be provided as a plurality of back cover optics 320*a*. The plurality of back cover optics 320*a* may be arranged to be spaced apart from each other in the inclination direction. For example, the plurality of back cover optics 320*a* may be arranged closer to the second direction L2 as they go upward. Through the arrangement of the plurality of back cover optics 320*a*, a three-dimensional effect may be provided to a person who looks at the lamp 10. The protrusion lengths "d" of the plurality of back cover optics 320*a* may be the same.

Figure 5:
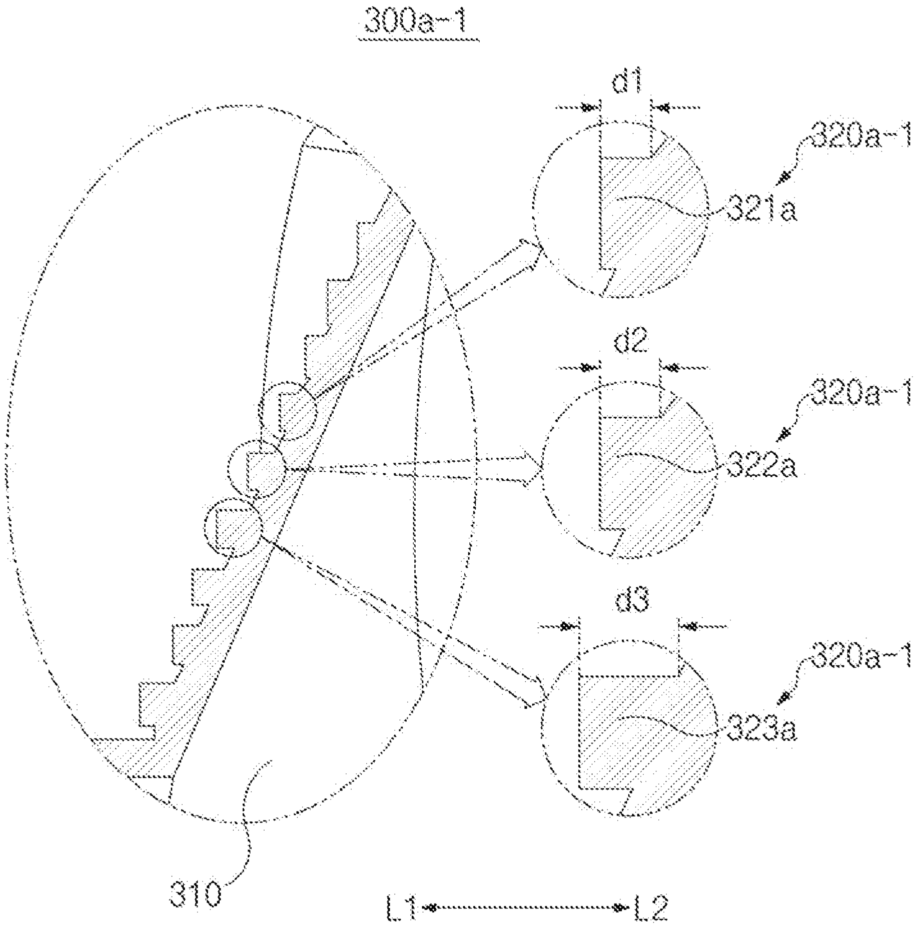
FIG. 5 is a cross-sectional perspective view of a back cover according to a first modification of the present disclosure.

However, the spirit of the present disclosure is not limited thereto, and hereinafter, a plurality of back cover optics 320*a*-1 according to a first modification that is a modification of the first embodiment will be described with reference to FIG. 5. A protrusion length of some of the plurality of back cover optics 320*a*-1 may differ from a protrusion length of other thereof. The plurality of back cover optics 320*a*-1 may include a first back cover optic 321*a*, a second back cover optic 322*a*, and a third back cover optic 323*a*.

A first protrusion length d1 that is a protrusion length of the first back cover optic 321*a*, a protrusion length d2 that is a protrusion length of the second back cover optic 322*a*, and a third protrusion length d3 that is a protrusion length of the third back cover optic 323*a* may differ from each other. For example, the first protrusion length d1 may be smaller than the second protrusion length d2. Further, the second protrusion length d2 may be smaller than the third protrusion length d3. When the protrusion lengths of the plurality of back cover optics 320*a*-1 are different from each other, perspective sense and image differentiation felt by the person who looks at the lamp 10 may be implemented. Meanwhile, the contents related to the plurality of back cover optics 320*a*-1 described in the first modification may be applied to back cover optics 320*b*, 320*c*, and 320*d* according to the second to fourth embodiments, which will be described below.

The frame 400 may form an exterior of the lamp 10. The frame 400 may support the light source part 100, the lens part 200, the back cover 300*a*, and the bezel 500. The frame 400 may be provided to be mounted on the vehicle.

The bezel 500 may be disposed at a central portion of the outer lens 220. The bezel 500 may be disposed to face the printed circuit board 110. The bezel 500 may block the light beam output from the light source 120 from being output to the outside of the lamp 10. In other words, the light beam may not be output from an area in which the bezel 500 is disposed.

Hereinafter, an optical path of the light beam output from the light source 120 will be described in detail. The light beam output from the light source 120 may travel in the second direction L2, be diffused in an up-down direction, and be input into the optic area 211. The light beam input into the optic area 211 may pass through the inner lens 210 and reach the reflective area 212. A portion of the light beam that reaches the reflective area 212 may be a first reflective light beam that may be reflected by the groove of the reflective area 212 and travel in the first direction L1. Further, a portion of the light beam that reaches the reflective area 212 may pass through the reflective area 212 and reach the back cover 300*a*. For example, the light beam passing through the reflective area 212 may pass through the gap and then reach the surface of the cover body 310 in the first direction L1. The light beam that reaches the surface of the cover body 310 in the first direction L1 may be a diffusion light that is diffused in the first direction L1. Further, the light beam that reaches the back cover optic 320*a* may be a second reflective light beam that may be reflected toward the first direction L1. The first reflective light beam, the second reflective light beam, and the diffusion light beam may pass through the inner lens 210 and be then output from the output area 213*a*.

Figure 6:
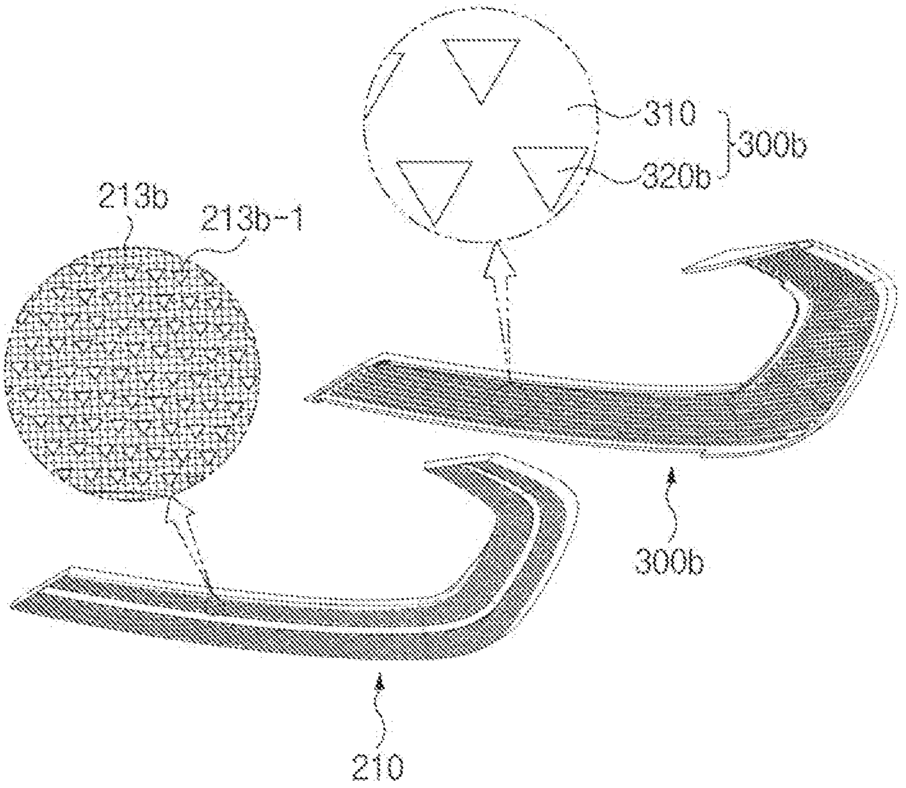
FIG. 6 is an exploded perspective view of the lamp according to a second embodiment of the present disclosure.

Hereinafter, an output area 213*b* and a back cover 300*b* according to a second embodiment of the present disclosure will be described with reference to FIG. 6. When the second embodiment is described, a difference between the first embodiment and the second embodiment will be mainly described. An output optic groove 213*b*-1 may be formed in the output area 213*b*.

The output optic groove 213*b*-1 may be a groove recessed in the second direction L2 from an end of the output area 213*b* in the first direction L1. Further, when the output area 213*b* is viewed in the first direction L1, the output optic groove 213*b*-1 may have a triangular shape. For example, when the output area 213*b* is viewed in the first direction L1, the output optic groove 213*b*-1 may have an equilateral triangular shape. The output optic groove 213*b*-1 may be provided as a plurality of output optic grooves 213*b*-1. The plurality of output optic grooves 213*b*-1 may be arranged to be spaced apart from each other.

The back cover 300*b* may include the cover body 310 and a back cover optic 320*b*. The cover body 310 refers to the description in the first embodiment. When the back cover optic 320*b* is viewed in the second direction L2, the back cover optic 320*b* may have a triangular shape. For example, when the back cover optic 320*b* is viewed in the second direction L2, the back cover optic 320*b* may have an equilateral triangular shape. Further, a size of the back cover optic 320*b* may be greater than a size of the output optic groove 213*b*-1. For example, a length of one side of the triangular shape of the back cover optic 320*b* may be greater than a length of one side of the triangular shape of the output optic groove 213*b*-1. The back cover optic 320*b* may be provided as a plurality of back cover optics 320*b*. The plurality of back cover optics 320*b* may be arranged to be spaced apart from each other in the inclination direction.

Figure 7:
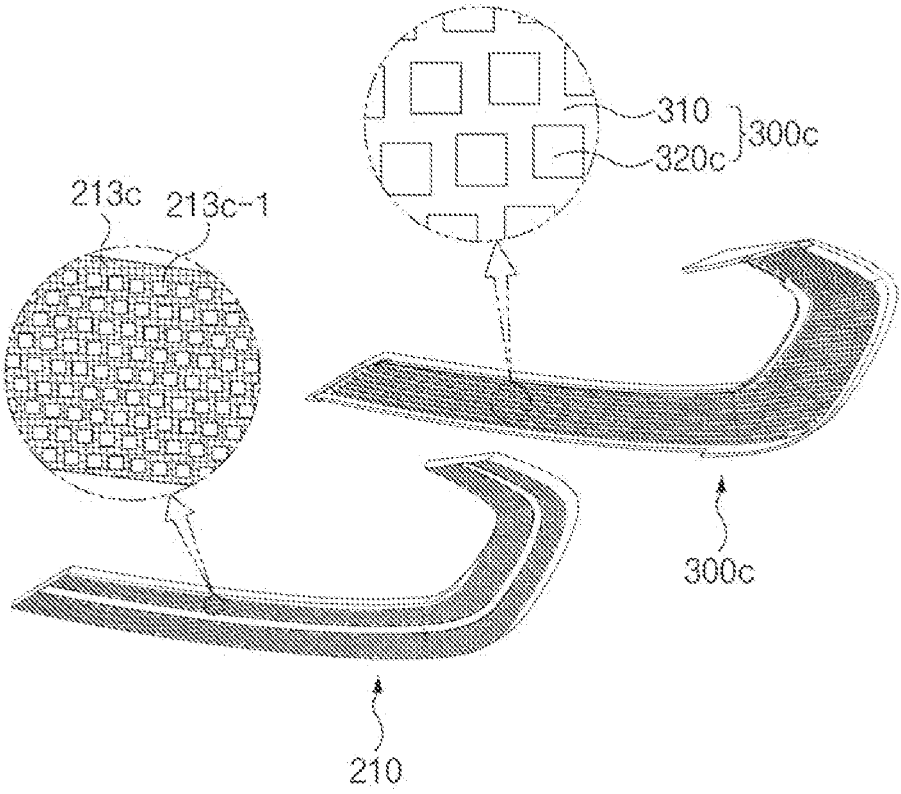
FIG. 7 is an exploded perspective view of the lamp according to a third embodiment of the present disclosure.

Hereinafter, an output area 213*c* and a back cover 300*c* according to a third embodiment of the present disclosure will be described with reference to FIG. 7. When the third embodiment is described, a difference between the first embodiment and the third embodiment will be mainly described. An output optic groove 213*c*-1 may be formed in the output area 213*c*.

The output optic groove 213*c*-1 may be a groove recessed in the second direction L2 from an end of the output area 213*c* in the first direction L1. Further, when the output area 213*c* is viewed in the first direction L1, the output optic groove 213*c*-1 may have a quadrangular shape. For example, when the output area 213*c* is viewed in the first direction L1, the output optic groove 213*c*-1 may have a square shape. The output optic groove 213*c*-1 may be provided as a plurality of output optic grooves 213*c*-1. The plurality of output optic grooves 213*c*-1 may be arranged to be spaced apart from each other.

The back cover 300*c* may include the cover body 310 and a back cover optic 320*c*. The cover body 310 refers to the description in the first embodiment. When the back cover optic 320*c* is viewed in the second direction L2, the back cover optic 320*c* may have a quadrangular shape. For example, when the back cover optic 320*c* is viewed in the second direction L2, the back cover optic 320*c* may have a square shape. Further, a size of the back cover optic 320*c* may be greater than a size of the output optic groove 213*c*-1. For example, a length of one side of the quadrangular shape of the back cover optic 320*c* may be greater than a length of one side of the quadrangular shape of the output optic groove 213*c*-1. The back cover optic 320*c* may be provided as a plurality of back cover optics 320*c*. The plurality of back cover optics 320*c* may be arranged to be spaced apart from each other in the inclination direction.

Hereinafter, an output area 213*d* and a back cover 300*d* according to a fourth embodiment of the present disclosure will be described with reference to FIGS. 8 to 10. When the fourth embodiment is described, a difference between the first embodiment and the fourth embodiment will be mainly described. An output optic groove 213*d*-1 may be formed in the output area 213*d*.

Figure 8:
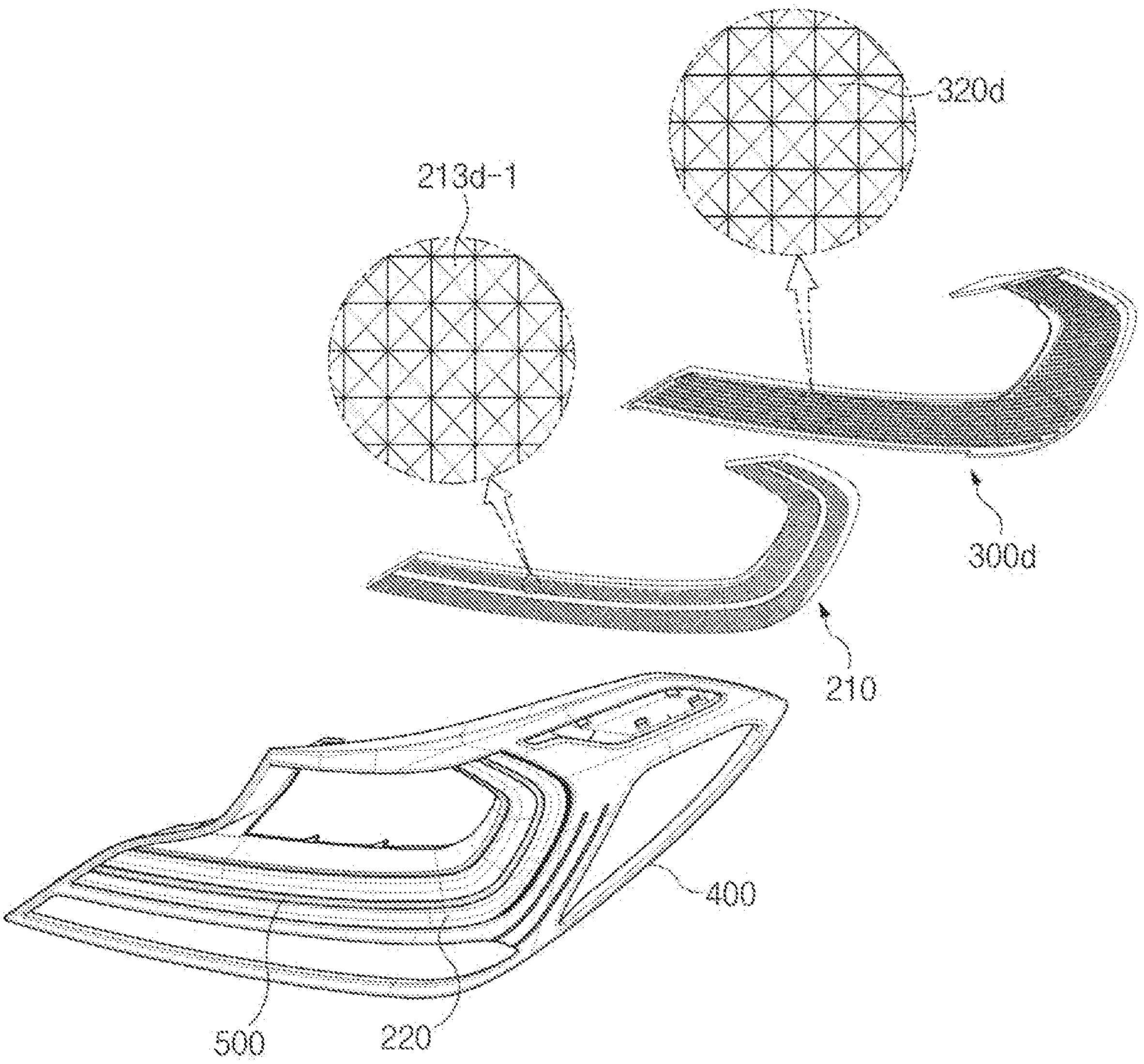
FIG. 8 is an exploded perspective view of the lamp according to a fourth embodiment of the present disclosure.
Figure 9:
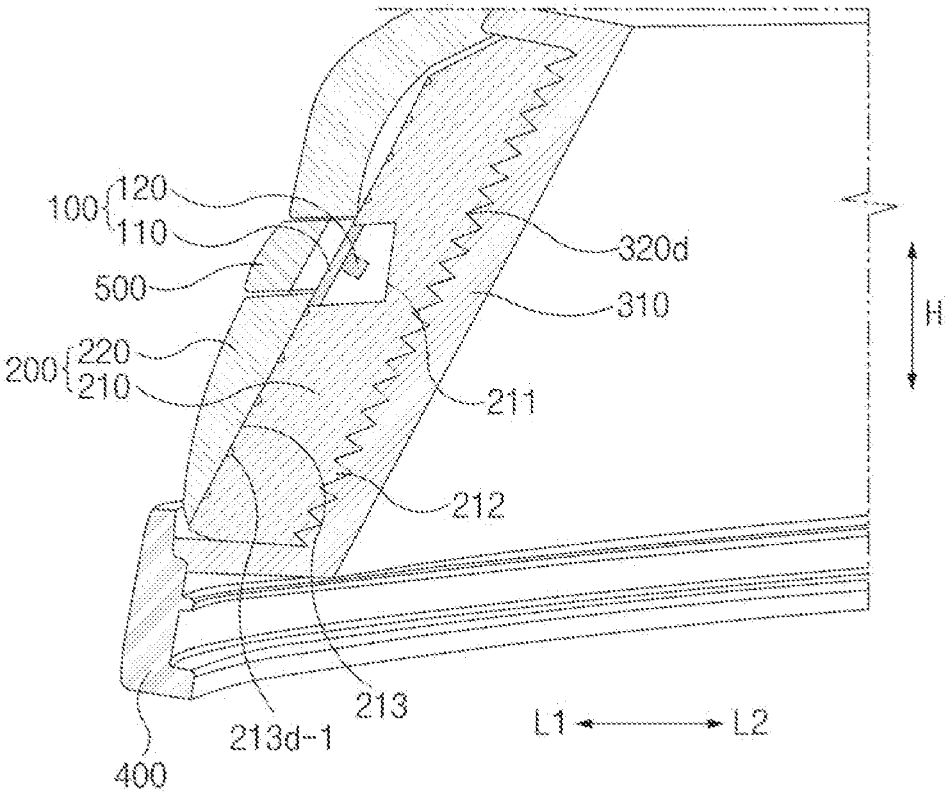
FIG. 9 is a longitudinal cross-sectional view of the lamp according to the fourth embodiment of the present disclosure.
Figure 10:
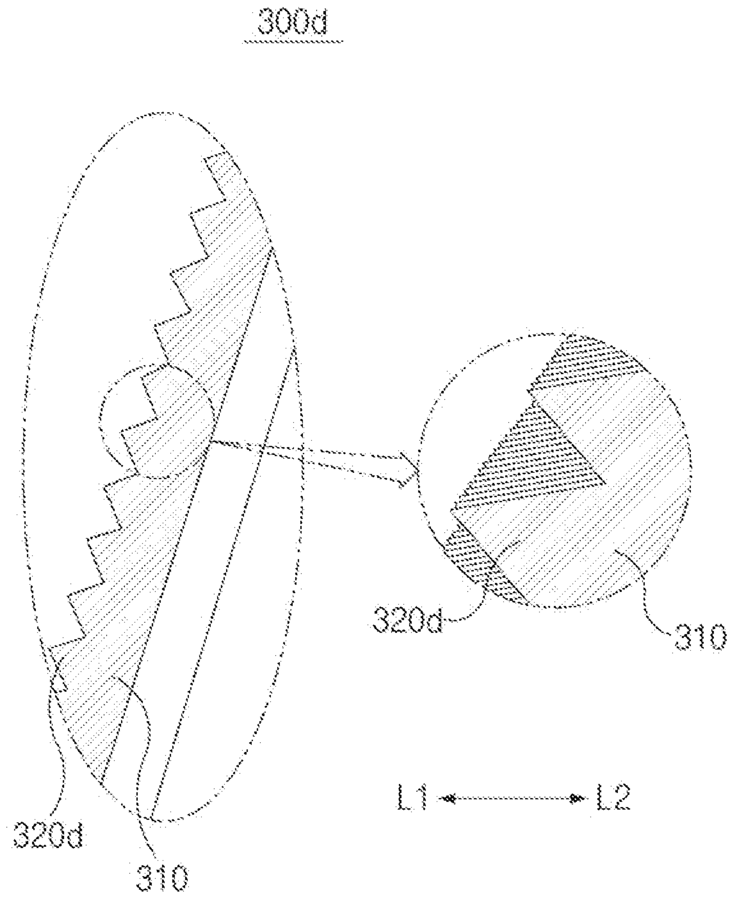
FIG. 10 is a cross-sectional perspective view of a back cover according to the fourth embodiment of the present disclosure.

Referring to FIGS. 8 and 9, the output optic groove 213*d*-1 may be a groove recessed in the second direction L2 from an end of the output area 213*d* in the first direction L1. Further, the output optic groove 213*d*-1 may have a triangular pyramid shape. For example, when the output area 213*d* is viewed in the first direction L1, the output optic groove 213*d*-1 may have a quadrangular shape. Further, when the output area 213*b* is viewed in the vertical direction "H," the output optic groove 213*d*-1 may have a triangular shape. The output optic groove 213*d*-1 may be provided as a plurality of output optic grooves 213*d*-1. The plurality of output optic grooves 213*d*-1 may be arranged to be adjacent to each other. For example, the plurality of output optic grooves 213*d*-1 may be arranged in a lattice pattern.

The back cover 300*d* may include the cover body 310 and a back cover optic 320*d*. The cover body 310 may be disposed closer to the second direction L2 than the back cover optic 320*d*. An additional description related to the cover body 310 refers to the description in the first embodiment.

The back cover optic 320*d* may have a triangular pyramid shape. For example, when the back cover optic 320*d* is viewed in the second direction L2, the back cover optic 320*d* may have a quadrangular shape. Further, when the back cover optic 320*d* is viewed in the vertical direction "H," the back cover optic 320*d* may have a triangular shape.

A size of the back cover optic 320*d* may be the same as a size of the output optic groove 213*d*-1. For example, when the lamp 10 is viewed in the first direction L1 and the second direction L2, a length of one side of the quadrangular shape of the back cover optic 320*d* may be the same as a length of one side of the quadrangular shape of the output optic groove 213*d*-1. The back cover optic 320*d* may be provided as a plurality of back cover optics 320*d*. The plurality of back cover optics 320*d* may be arranged to be adjacent to each other in the inclination direction. For example, referring to FIG. 10, when the lamp 10 is viewed in the direction perpendicular to the first direction L1 and the vertical direction "H," the groove of the reflective area 212 and the plurality of back cover optics 320*d* may be arranged alternately with each other in the inclination direction. Further, the light beam passing through the reflective area 212 may reach the plurality of back cover optics 320*d*.

A lamp according to the present disclosure may output a light beam in a targeted direction without an air gap and thus has a minimized volume.

Hereinabove, even though it has been described that all components constituting the embodiments of the present disclosure are combined into one part or are operated while combined with each other, the present disclosure is not necessarily limited to these embodiments. That is, all the components may be operated while selectively combined into one or more parts within the scope of the present disclosure. Further, terms such as "includes", "constitutes", or "have" described above mean that the corresponding component may be inherent unless otherwise stated, and thus should be construed as not excluding other components but further including other components. All terms including technical or scientific terms have the same meanings as those commonly understood by those skilled in the art to which the present disclosure pertains unless otherwise defined. The generally used terms defined in the dictionaries should be construed as having the meanings that coincide with the meanings of the contexts of the related technologies, and should not be construed as ideal or excessively formal meanings unless clearly defined in the present disclosure.

The above description is merely illustrative of the technical spirit of the present disclosure, and those skilled in the art to which the present disclosure belongs may make various modifications and changes without departing from the essential features of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A lamp configured to output a light beam externally in a first direction, comprising:

a light source part configured to output the light beam in a second direction opposite to the first direction; and an inner lens including (1) a reflective area facing the light source part and configured to reflect, in the first direction, the light beam output from the light source part and (2) an output area configured to output, in the first direction, the light beam reflected by the reflective area, wherein the output area of the inner lens is located closer to an outside of the lamp to which the light beam is output than where the reflective area is located, wherein the inner lens is configured such that the light beam reflected by the reflective area is directly transmitted in the first direction to the output area of the inner lens, wherein the output area includes a plurality of output optic grooves spaced apart from each other;

wherein:

the inner lens includes an optic area located corresponding to the light source part, the optic area having a recessed space extending from the outer surface area toward the reflective area, and the light beam output from the light source part is transmitted to the reflective area via the optic area;

wherein the recessed space extends, in the second direction, from the outer surface area of the inner lens; and wherein the inner lens further includes a recessed surface portion surrounding the recessed space of the optic area, the recessed surface portion including:

an upper surface portion extending in the second direction toward the output area and having a first length; and a lower surface portion extending in the second direction toward the output area and having a second length greater than the first length.

2. The lamp of claim 1, wherein a side of the reflective area facing in the first direction faces a side of the output area facing in the second direction.

3. The lamp of claim 1, wherein the plurality of output optic grooves has a circular or polygonal shape when viewed in the first direction.

4. The lamp of claim 1, wherein the reflective area and the output area are together integrally formed.

5. The lamp of claim 1, wherein:

the light source part includes:

a printed circuit board extending along the inner lens; and a plurality of light sources arranged on a side of the printed circuit board in the second direction and spaced apart from each other in a direction in which the printed circuit board extends, and the optic area includes a plurality of recessed spaces respectively disposed corresponding to the plurality of light sources.

6. The lamp of claim 1, further comprising a back cover configured to surround a side of the inner lens in a second direction, wherein the back cover includes:

a cover body having a side facing in the first direction toward a side of the reflective area; and a back cover optic protruding in the first direction from the side of the cover body.

7. The lamp of claim 6, wherein:

the cover body obliquely extends such that an upper side thereof is inclined in the second direction with respect to a vertical direction of the lamp, and the back cover optic includes a plurality of back cover optics spaced apart from each other.

8. The lamp of claim 7, wherein the cover bodies of the plurality of back cover optics protruding in the first direction are of a common length.

9. The lamp of claim 7, wherein the cover bodies of some of the plurality of back cover optics protruding in the first direction have a length different from that of the cover bodies of the others of the plurality of back cover optics protruding in the first direction.

10. The lamp of claim 6, wherein a gap between the side of the cover body facing in the first direction and the reflective area has a width in the first direction that is smaller than a length of the back cover optic protruding from a side thereof in the first direction toward the reflective area.

11. The lamp of claim 10, wherein:

the light beam transmitted from the light source part to the reflective area has a first portion reflected in the first direction and a second portion passing through the reflective area, and the second portion of the light beam is diffused in the first direction on a surface of the cover body.

12. The lamp of claim 6, wherein a reflective material is deposited on a surface of the back cover optic in the first direction.

13. The lamp of claim 12, wherein the reflective material includes an aluminum material.

14. The lamp of claim 6, wherein the back cover optic and the reflective area at least partially overlap each other.

15. The lamp of claim 6, wherein the back cover optic has a circular or polygonal shape.

* * * * *